(12) United States Patent
Lin et al.

(10) Patent No.: US 9,477,678 B2
(45) Date of Patent: Oct. 25, 2016

(54) DATA SYNCHRONIZATION MANAGEMENT METHODS AND SYSTEMS

(71) Applicant: HTC Corporation, Taoyuan, Taoyuan County (TW)

(72) Inventors: Zih-Ci Lin, Taoyuan (TW); Hsi-Kun Chen, Taoyuan (TW); Peter Chou, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 656 days.

(21) Appl. No.: 13/748,141

(22) Filed: Jan. 23, 2013

(65) Prior Publication Data
US 2014/0207734 A1   Jul. 24, 2014

(51) Int. Cl.
*G06F 7/00* (2006.01)
*G06F 17/30* (2006.01)
*H04L 29/08* (2006.01)

(52) U.S. Cl.
CPC ... *G06F 17/30174* (2013.01); *G06F 17/30575* (2013.01); *H04L 67/1095* (2013.01); *H04L 67/22* (2013.01)

(58) Field of Classification Search
CPC ............. G06F 17/30575; G06F 17/30286; G06F 17/30067
USPC ........................................................ 707/610
See application file for complete search history.

(56) References Cited

U.S. PATENT DOCUMENTS

| 2004/0024910 | A1 | 2/2004 | Marl et al. |
| 2005/0164703 | A1 | 7/2005 | Huynh |
| 2006/0173971 | A1 | 8/2006 | Russell |
| 2008/0270547 | A1* | 10/2008 | Glickstien ........... H04L 67/1095 709/206 |
| 2009/0190704 | A1* | 7/2009 | Ben-Ari ................. H04L 7/042 375/365 |
| 2010/0076976 | A1* | 3/2010 | Sotirov ............. G06F 17/30241 707/737 |
| 2010/0122324 | A1 | 5/2010 | Welingkar et al. |
| 2011/0258160 | A1* | 10/2011 | Lee ........................ G06Q 10/00 707/626 |
| 2012/0151398 | A1* | 6/2012 | Foy .................... G06F 17/30268 715/769 |
| 2012/0170569 | A1* | 7/2012 | Al-Khudairi ........... H04L 69/28 370/346 |
| 2012/0191418 | A1* | 7/2012 | Cheng .............. G01R 31/31726 702/189 |
| 2013/0035990 | A1* | 2/2013 | Sharma .............. G06Q 10/0637 705/7.36 |
| 2013/0290820 | A1* | 10/2013 | Dhanani ........... G06F 17/30873 715/205 |

FOREIGN PATENT DOCUMENTS

| CN | 1645816 A | 7/2005 |
| TW | 201202959 A1 | 1/2012 |
| TW | 201229774 A1 | 7/2012 |
| WO | WO 03/094029 A1 | 11/2003 |

* cited by examiner

*Primary Examiner* — Loan T Nguyen
(74) *Attorney, Agent, or Firm* — Birch, Stewart, Kolasch & Birch, LLP

(57) ABSTRACT

Data synchronization management methods and systems for use in an electronic device are provided. First, activity log containing information regarding activities of friends of a user in an application within a specific period of time is acquired from a network application server via a network. Next, the activity log is analyzed to determine a frequency of activities of the application in each of time segments of a day. A sync frequency of a data sync procedure for each of the time segments is determined or adjusted according to the frequency of activities of the application in each of the time segments. The data sync procedure is performed with the network application server to update data from the server based on the sync frequency in each of the time segments.

16 Claims, 3 Drawing Sheets

DATA SYNCHRONIZATION MANAGEMENT METHODS AND SYSTEMS

BACKGROUND OF THE INVENTION

1. Field of the Invention

The disclosure relates generally to data synchronization management methods and systems and, more particularly, to methods and systems that provide management for dynamic adjustment of the sync frequency of data synchronization based on user behavior information recorded on network application servers.

2. Description of the Related Art

Recently, portable devices such as handheld devices have become more and more technically advanced and multifunctional. For example, a handheld device may receive email messages, have an advanced address book management application, allow media playback, and have various other functions. Because of the conveniences of devices with multiple functions, the devices have become necessities of life.

Mobile devices may be provided with multiple applications or services for users to control the functions thereof. Mobile devices may perform a data synchronization procedure to sync with the application servers of a number of running applications periodically in order to update and/or exchange data in running applications.

For example, the mobile device communicates with social network application providers providing social network applications (e.g., Facebook, Twitter, Google+, etc.) through a communication network. Conventionally, data updating of those applications are performed with a fixed sync frequency, e.g. updating per hour. Performing data updating with a fixed sync frequency, however, may lead to unnecessary sync updates since the data synchronization procedure still needs to be performed to sync with the network application servers of the running applications for updating data even if no data is to be updated, thus consuming extra power. Furthermore, this type of social network applications needs to be updated whenever a friend of the user post new contents. However, such kind of update may not be related to the user behavior of the mobile device.

BRIEF SUMMARY OF THE INVENTION

Data synchronization management methods and systems are provided.

In an embodiment of a data synchronization method, activity log containing information regarding activities of an application corresponding to an user within a specific period of time is acquired from a network application server via a network. Next, the activity log is analyzed to determine a frequency of activities of the application in each of time segments of a day. A sync frequency of a data sync procedure for each of the time segments is determined/adjusted according to the frequency of activities of the application in each of the time segments, and then perform the data sync procedure with the network application server to update data from the server based on the sync frequency in each of the time segments.

An embodiment of a data synchronization management system for use in an electronic device includes a wireless communication unit and a processing unit. The processing unit is coupled to the wireless communication unit and is used for acquiring activity log containing information regarding activities of friends of a user in an application within a specific period of time from a network application server via the wireless communication unit, analyzing the activity log to determine a frequency of activities of the application in each of time segments of a day, determining/adjusting a sync frequency according to the frequency of activities of the application in each of the time segments, and performing the data sync procedure with the network application server to update data from the server based on the sync frequency in each of the time segments.

Data synchronization management methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Data synchronization management methods and systems are provided.

Figure 1:
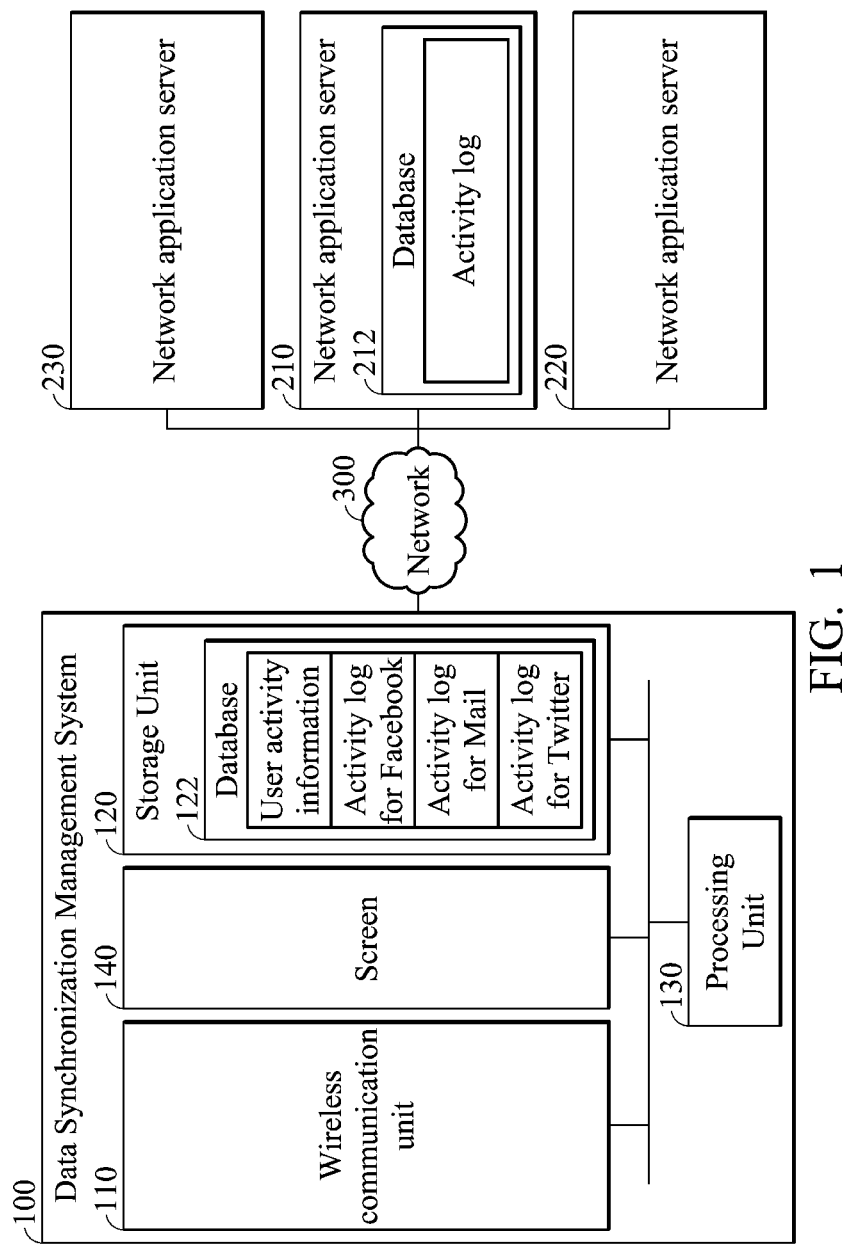
FIG. 1 is a schematic diagram illustrating an embodiment of a data synchronization management system of the invention.

FIG. 1 is a schematic diagram illustrating an embodiment of a data synchronization management system of the invention. The data synchronization management system 100 can be used in an electronic device, such as a PDA (Personal Digital Assistant), a smart phone, a mobile phone, an MID (Mobile Internet Device, MID), a laptop computer, a car computer, a digital camera, a multi-media player, a gaming device, or any other type of mobile computational device, however it is to be understood that the invention is not limited thereto. The data synchronization management system 100 at least comprises a wireless communication unit 110, a storage unit 120, and a processing unit 130. The wireless communication unit 110 may perform the functionality of wireless transmissions and receptions to and from a number of application servers 210-230, such as social network servers providing social network application (e.g. Facebook, Twitter and so on) or mail servers via a network 300, such as WCDMA, 3G network, Internet or other wired/wireless network. To further clarify, the wireless communication unit 110 may comprise a baseband unit (not shown) and a radio frequency (RF) unit (not shown). The baseband unit may contain multiple hardware components to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. The processing unit 130 may further control the operation of the wireless communication unit 110 and other functional components, such as a screen unit 140 and/or keypad serving as the MMI (man-machine interface), the storage unit 120 storing the program codes of applications or communication protocols, or others.

The storage unit 120 may be a built-in memory, or an external memory card, which stores related data, such as activity logs for different network applications. The storage unit 120 comprises a database 122 for storing the activity logs for different applications. In some embodiments, the database 122 may be divided into a plurality of portions, each storing activity log of a corresponding social network application. For example, as shown in FIG. 1, the database 122 stores activity logs of Twitter, mail, Facebook and user activity information on the mobile device respectively.

It is understood that, most of the social network application providers may log the activities of a user's account, including content updates by the account and his/her friends, fan page and/or groups the user joins, etc. The content may comprise personal status, photo, video, tag to locations, and/or others provided by the social network application providers. In the embodiments of the invention, the processing unit 130 may acquire/download the activity log of user's account from the database 212 of the network application server 210 via the wireless communication unit 110 and then analyze/parse the activity log to determine the frequency of activities with respect to the user's account. Note that a user of the electronic device (e.g. a mobile phone user) may have at least one respective account for accessing the network application server 210 which may be any social network application servers or mail server, such as servers for Facebook, Twitter, Google+ and so on, and the network application server 210 may store activity log corresponding to the respective account into the database 212. For example, the user may have a Facebook account for accessing the Facebook server and the Facebook server may store activity log corresponding to this Facebook account. When the user is logged into the Facebook server using the Facebook account, the electronic device is connected to the Facebook server and can access the activity log corresponding to the Facebook account. It is noted that, the aforementioned network application servers are examples of the present application, and the present invention is not limited thereto.

The data synchronization management 100 may further comprise a screen 140. The screen 140 can display data, such as texts, figures, interfaces, and/or information. It is understood that, in some embodiments, the screen 140 may be integrated with a touch-sensitive device (not shown). The touch-sensitive device has a touch-sensitive surface comprising sensors in at least one dimension to detect contact and movement of at least one object (input tool), such as a pen/stylus or finger near or on the touch-sensitive surface. Accordingly, users are able to input commands or signals via the screen. Therefore, the user activity on the electronic device can be determined by determining whether the user turns on the screen 140. Whenever the user turns on the screen 140, the processing unit 130 may log the time which the screen 140 being turned on into the database 122 as the user activity information for subsequent use. The processing unit 130 can perform the data synchronization management method of the present invention, which will be discussed further in the following paragraphs. To be more specific, the processing unit 130 may update the database 122 in a predetermined frequency, e.g., once per week, per month or other suitable time period. Furthermore, the processing unit 130 may parse/analyze the activity log to determine the time distribution of activities (e.g. updates) with respect to the user's account on these social network applications, and thus determine the frequency of synchronization for each social network applications. For example, if most of the user's friends tend to post new contents during the time segment from 9:00 AM to 5:00 PM, and nearly have no activity during the time segment from 11:00 PM to 6:00 AM next morning, the processing unit 130 may set the sync period to sync for updates every 10 minutes during the time segment from 9:00 AM to 5:00 PM, and every hour during the time segment from 11:00 PM to 6:00 AM.

Figure 2:
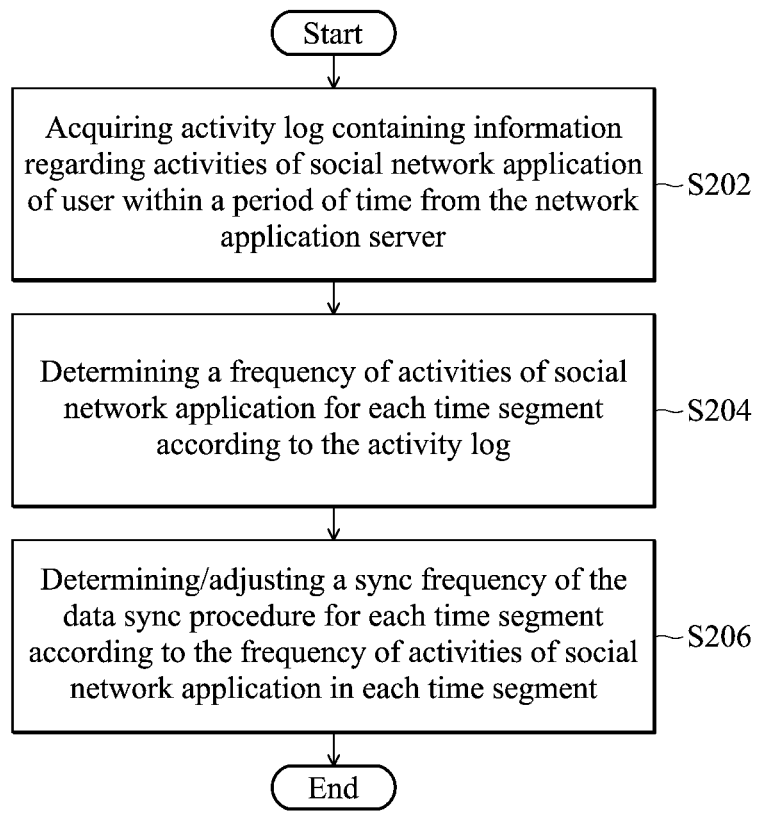
FIG. 2 is a flowchart of an embodiment of a data synchronization method of the invention.

FIG. 2 is a flowchart of an embodiment of a data synchronization management method of the invention. The data synchronization management method can be used for an electronic device, such as a PDA, a smartphone, a mobile phone, an MID, a laptop computer, a car computer, a digital camera, a multi-media player or a gaming device.

In step S202, activity log containing information regarding activities of the social network application of the user within a period of time is acquired from the network application server. As described above, the activity log of a user account may include information regarding content updates by the account, data update quantity of the account and his/her friends, fan page and/or groups the user joins, etc, wherein the content may comprise personal status, photo, video, tag to locations, and/or others provided by the social network application providers. Thus, the electronic device may acquire the activity log of user's account from the database of the network application server. It is understood that, in this embodiment, the activity log may at least log the behavior of a group of registered users corresponding to the user (e.g. friends of the user on Facebook), the activity log may indicate how many friends had updated data (e.g. posting new content) to the network application server during different time segments, but it is not limited thereto.

After the activity log has been acquired from the network application server, in step S204, it is determined a frequency of activities of the social network application registered by the user for each time segment according to the activity log. Note that, in this embodiment, a day is divided into a number of time segments (e.g. 12 time segments, each for two hours). For example, if the activity log comprises information for a past week, the processing unit 130 may analyze the activity log to analyze the behavior of the user and his/her friends within the past week to obtain an averaged number of the friends that update data in each time segment during the past week, and then determine a frequency of data update based on the averaged number of the friends who update data in each time segment. For example, if the activity log indicates that there are totally 70, 70, 90, 80, 70, 95 and 85 friends updating their data during a same time segment of the past week from Monday to Sunday respectively, the averaged number of the friends that update data obtained in this time segment can be determined as 80. In other words, there is an average of 80 friends updating data in this time segment.

After the frequency of activities of the social network application for each time segment is determined, in step S206, the sync frequency of the data sync procedure for each time segment is determined according to the frequency of activities of the social network application in each time segment. Therefore, the data sync procedure will be performed based on the sync frequency. In this step, the sync frequency is increased to set a shorter sync period for the data sync procedure in response to determining that activities of the social network application, either by the user or his/her friends, etc. is in high frequency, for example above a predetermined first threshold. While the sync frequency is decreased to set a longer sync period for the data sync procedure in response to determining that activities of the social network application is not in high frequency, for example below a predetermined second threshold. If the frequency of activities of the social network application indicates that the friends of the user update new data often (i.e. the frequency of activities of the social network application is above the predetermined first threshold) during a first time segment, the sync frequency of the data sync procedure of this application can be increased. Otherwise, the sync frequency of the data sync procedure of this application can be decreased during the first time segment.

For example, if the previous sync frequency of the application or the electronic device is set to update every 30 minutes when more than 20 friends update their data during a time segment from 9:00 AM to 6:00 PM, the sync frequency of the application can be increased to shorten the time period less than 30 minutes when the frequency of activities of the social network application indicates that there is an average of more than 80 friends updating their data during the time segment from 9:00 AM to 6:00 PM, or it may be decreased to extend the time period to 4 hours, a day or longer when the frequency of activities of the social network application indicates that there is an average of less than 20 friends updating their data during the time segment from 9:00 AM to 6:00 PM.

In another embodiment, a frequency of which the user turns on the screen 140 of the electronic device in each of the time segments may further be determined, and the sync frequency of the data sync procedure may be adjusted according to the frequency of activities of the social network application and the frequency of which the user turns on the screen 140 of the electronic device in each of the time segments. If the frequency which the user turns on a screen of the electronic device indicates that the device is frequently being used (i.e. the user turns on the screen frequently) during a second time segment, the sync frequency of the social network application in the second time segment may be increased to a shorter period so that the data sync procedure will be performed more often to quickly update with new data. If the frequency of which the user turns on the screen 140 of the electronic device indicates that the device is rarely used during a third time segment, the sync frequency of the social network application in the third time segment may be decreased to a longer period so that the data sync procedure will be performed less often to save power during the third time segment.

Figure 3:
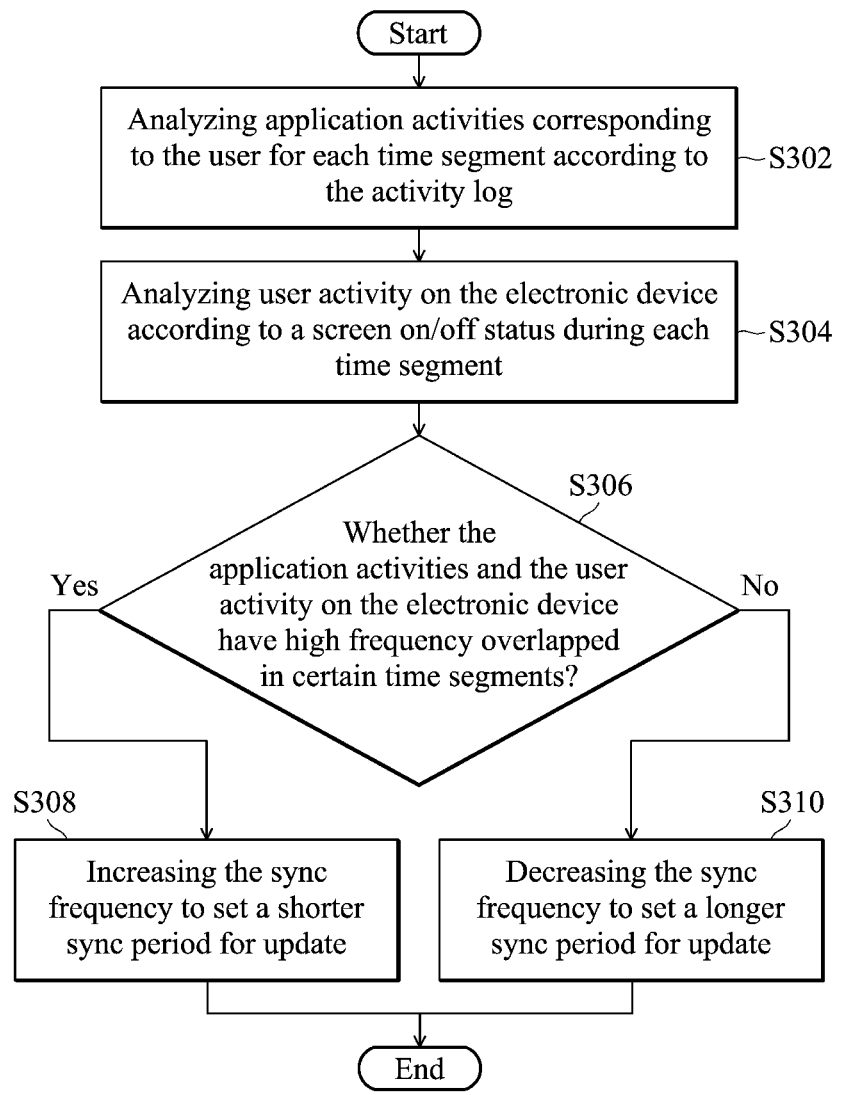
FIG. 3 is a flowchart of another embodiment of a data synchronization method of the invention.

FIG. 3 is a flowchart of another embodiment of a data synchronization management method of the invention. The data synchronization management method can be used for an electronic device, such as a PDA, a smartphone, a mobile phone, an MID, a laptop computer, a car computer, a digital camera, a multi-media player or a gaming device. In this embodiment, it is assumed that time regions within a day are divided into several time segments and the activity log is acquired or downloaded from the network application server 210.

In step S302, the application activity corresponding to the user is analyzed for each time segment according to the activity log. The application activity indicates the frequency that the friends of the user updating data for each time segment for example. Then, in step S304, the user activity on the electronic device is further analyzed according to a screen (e.g. a touch screen) on/off status during each time segment. The user activity on the electronic device may be analyzed by determining whether the user would check updates of his/her account by monitoring whether the user performs operation on the screen of the electronic device. The user operation on the electronic device can be recorded in the database 122 of FIG. 1 along with the activity log of the social network application.

After the application activity corresponding to the user and the user activity on the electronic device for each time segment have been obtained, it is further determined whether the application activity and the user activity on the electronic device have high frequency overlapped in certain time segments according to the determined results of the activity log and the user activity on the electronic device (step S306). If so (Yes in step S306), which means that the application activity corresponding to the user in a specific time segment is in high frequency, for example above a predetermined threshold, and the user activity on the electronic device in that specific time segment is in high frequency too (above a predetermined threshold too), the sync interval for update is set shorter so that the user may access to the latest content faster (step S308). If not (No in step S306), which means that the application activity corresponding to the user in a specific time segment is not in high frequency and the user activity on the electronic device in that specific time segment is not in high frequency either, the sync internal may be set longer since there might be no update or user would not check for new update during that specific time segment (step S310).

In one embodiment, once the sync frequency for each time segment is determined, the sync frequency is further dynamically adjusted in response to a new data being requested to be updated to the network application server. In another embodiment, the data sync procedure may be determined as not to be performed during a specific time segment and be rescheduled to another time segment. For example, if it is assumed that night time is defined as a time segment from 11:00 PM to 6:00 AM and daytime is defined as a time segment from 6:00 AM to 11:00 PM, the data sync procedure may be determined as not to be performed during the night time for saving power and the data sync procedure is then resumed to normal during the daytime.

In some embodiments, the processing unit 130 may further analyze the activity log to determine a data update quantity corresponding to the social network application in each of the time segments, and then adjust the sync frequency of the data sync procedure in each time segment according to the activities of the social network application and the data update quantity corresponding to the social network application in each of the time segments.

In some embodiments, the processing unit 130 may further determine a weighting value of sync priority for each friend of the user on the social network application based on the interaction between the user and associated users (e.g. his/her friends). Each of the friends may be provided with a weighting value and the processing unit 130 may analyze the activity log with the weighting values of the friends to determine a weighted frequency of activities of the social network application in each of the time segments, and determine/adjust the sync frequency of the data sync procedure for each time segment according to the weighted frequency of activities of the social network application in each time segment. For example, if the user frequently replies the post from a specific friend on Facebook, the weighting value for this specific friend may be increased. In other words, the processing unit 130 may increase the weighting value for a number of specific friends, e.g. family (e.g. wife, husband), boss or other important people and then may adjust the sync frequency or the times for sync during the analyzing step.

In another embodiment, the data synchronization management system 100 may further provide a user interface (not shown) for the user to manually configure the sync frequency for each time segment and/or the weighting values for the friends to indicate which friends are important. The processing unit 130 may then adjust or change the parameters to adjust the frequency or times for data sync based on the configured parameters.

In summary, the data synchronization management methods and systems of the invention can adaptively determine/adjust the sync frequency for data sync procedure of applications or services based on historical activity log containing information indicating behavior of friends of the user within a predetermined time period acquired from the network application server such that the data sync procedure can be performed efficiently in each time segment within a day, thus saving power and resulting in a longer battery life.

Data synchronization management methods, or certain aspects or portions thereof, may take the form of a program code (i.e., executable instructions) embodied in tangible media, such as floppy diskettes, CD-ROMs, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A computer-implemented data synchronization management method for use in an electronic device, comprising:
   acquiring activity log containing information regarding activities of an application corresponding to an user within a specific period of time from a network application server via a network;
   analyzing the activity log to determine a frequency of activities of the application in each of time segments of a day;
   adjusting a sync frequency of a data sync procedure in each of the time segments according to the frequency of activities of the application in each of the time segments;
   performing the data sync procedure with the network application server based on the adjusted sync frequency;
   providing each of the friends of the user in the application a weighting value, wherein the weighting value indicates a sync priority for each friend of the user and is dynamically changed according to a frequency of the interaction between the user and the respective friend;
   analyzing the activity log with the weighting values of the friends to determine a weighted frequency of activities of the application in each of the time segments;
   adjusting the sync frequency of the data sync procedure for each of the time segments according to the weighted frequency of activities of the application in each of the time segments;
   determining a frequency of which a screen of the electronic device is turn on in each of the time segments; and
   adjusting the sync frequency of the data sync procedure according to the frequency of activities of the application and the frequency of which the screen is turn on in each of the time segments.

2. The method of claim 1, wherein the adjusting step further comprises:
   increasing the sync frequency in response to determining that the frequency of activities of the application is above a first threshold; and
   decreasing the sync frequency in response to determining that the frequency of activities of the application is below a second threshold.

3. The method of claim 1, wherein the step of adjusting the sync frequency of the data sync procedure according to the frequency of activities of the application and the frequency of which the screen is turn on in each of the time segments further comprises:
   increasing the sync frequency in response to determining the frequency of activities of the application or the frequency of which the screen is turn on is above a first threshold; and
   decreasing the sync frequency in response to determining the frequency of activities of the application and the frequency of which the screen is turn on are below a second threshold.

4. The method of claim 1, further comprising:
   analyzing the activity log to determine a data update quantity of activities of the application in each of the time segments; and
   adjusting the sync frequency of the data sync procedure for each of the time segments according to the frequency of activities of the application and the data update quantity of activities of the application in each of the time segments.

5. The method of claim 1, wherein the sync frequency is further dynamically adjusted in response to a new data being requested to be updated in the network application server.

6. The method of claim 1, further comprising storing the activity log into a database of the electronic device.

7. The method of claim 1, wherein the data sync procedure is determined as to be performed during a specific time segment of the time segments and to be re-performed during another time segment.

8. The method of claim 1, further comprising providing a user interface for manually adjusting the sync frequency of the data sync procedure by the user.

9. A data synchronization management system for use in an electronic device, comprising:
   a screen;
   a wireless communication unit; and
   a processing unit coupled to the wireless communication unit, configured to acquire activity log containing information regarding activities of friends of a user in an application within a specific period of time from a network application server via the wireless communication unit, analyze the activity log to determine a frequency of activities of the application in each of time segments of a day, adjust a sync frequency of a data sync procedure for each of the time segments according to the frequency of activities of the application in each of the time segments, and perform the data sync procedure with the network application server to update data from the server based on the adjusted sync frequency, wherein the processing unit is further configured to determine a frequency of which the user turns on the screen in each of the time segments; and adjust the sync frequency according to the frequency of activities of the application and the frequency of which the user turns on the screen in each of the time segments.

10. The system of claim 9, wherein the processing unit is further configured to increase the sync frequency in response to determining the frequency of activities of the application is above a first threshold, and decrease the sync frequency in response to determining that the frequency of activities of the application is below a second threshold.

11. The system of claim 9, wherein the processing unit is further configured to increase the sync frequency in response to determining the frequency of activities of the application or the frequency of which the user turns on the screen is above a first threshold, and decrease the sync frequency in response to determining the frequency of update that the friends of the user updating data and the determined frequency of which the user turns on the screen are below a second threshold.

12. The system of claim 9, wherein the processing unit is further configured to analyze the activity log to determine a data update quantity of friends of the user in the application in each of the time segments, and adjust the sync frequency according to the frequency of activities of the application and the data update quantity of the application in each of the time segments.

13. The system of claim 9, further comprising a storage unit comprising a database for storing the activity log.

14. The system of claim 9, further comprising a user interface for manually adjusting the sync frequency of the data sync procedure by the user.

15. The system of claim 9, wherein the network application server comprises a social network server providing a social network application.

16. A data synchronization management method of an electronic device, the method comprises:
    acquiring activity log containing information regarding activities of friends of a user in an application within a specific period of time from a network application server;
    analyzing the activity log to determine a frequency of the friends of the user updating data in each of time segments of a day;
    determining a sync frequency of a data sync procedure for each of the time segments according to the frequency of the friends of the user updating data in each of the time segments;
    performing the data sync procedure with the network application server to update data from the server based on the sync frequency in each of the time segments;
    providing each of the friends of the user in the application a weighting value, wherein the weighting value indicates a sync priority for each friend of the user and is dynamically changed according to a frequency of the interaction between the user and the respective friend;
    analyzing the activity log with the weighting values of the friends to determine a weighted frequency of activities of the application in each of the time segments;
    adjusting the sync frequency of the data sync procedure for each of the time segments according to the weighted frequency of activities of the application in each of the time segments;
    determining a frequency of which a screen of the electronic device is turn on in each of the time segments; and
    adjusting the sync frequency of the data sync procedure according to the frequency of activities of the application and the frequency of which the screen is turn on in each of the time segments.

* * * * *